United States Patent
Kunchala et al.

(10) Patent No.: US 11,828,492 B2
(45) Date of Patent: Nov. 28, 2023

(54) IDENTIFICATION OF PREMATURE HEAT EXCHANGER FAILURE

(71) Applicant: Carrier Corporation, Palm Beach Gardens, FL (US)

(72) Inventors: Sai Krishna Kunchala, Hyderabad (IN); David R. King, Brownsburg, IN (US)

(73) Assignee: Carrier Corporation, Palm Beach Gradens, FL (US)

( * ) Notice: Subject to any disclaimer, the term of this patent is extended or adjusted under 35 U.S.C. 154(b) by 0 days.

(21) Appl. No.: 17/448,921

(22) Filed: Sep. 27, 2021

(65) Prior Publication Data

US 2022/0107115 A1    Apr. 7, 2022

Related U.S. Application Data

(60) Provisional application No. 63/198,169, filed on Oct. 1, 2020.

(51) Int. Cl.

| F24H 8/00 | (2022.01) |
| F24H 9/20 | (2022.01) |
| G08B 21/18 | (2006.01) |
| H04L 67/12 | (2022.01) |

(52) U.S. Cl.
CPC ........... *F24H 8/006* (2013.01); *F24H 9/2085* (2013.01); *G08B 21/182* (2013.01); *H04L 67/12* (2013.01)

(58) Field of Classification Search
CPC ................. F24H 8/006; F24H 9/2085
See application file for complete search history.

(56) References Cited

U.S. PATENT DOCUMENTS

| 4,289,730 | A | * | 9/1981 | Tomlinson | B01D 53/34 |
| | | | | | 210/275 |
| 4,323,371 | A | * | 4/1982 | Ritvanen | B01D 53/501 |
| | | | | | 422/111 |
| 4,600,561 | A | * | 7/1986 | Frei | B01D 53/501 |
| | | | | | 95/36 |
| 9,033,649 | B2 | | 5/2015 | Kato | |
| 2019/0203976 | A1 | * | 7/2019 | Scott | F16L 55/07 |
| 2020/0041374 | A1 | * | 2/2020 | Deivasigamani | G01M 3/04 |

FOREIGN PATENT DOCUMENTS

| CN | 103134070 A | 6/2013 |
| CN | 106885637 A | 6/2017 |

* cited by examiner

*Primary Examiner* — Steven S Anderson, II

(57) ABSTRACT

A furnace with a condensing heat exchanger and a pH sensor, and a method of monitoring the furnace are provided. The furnace may include a condensate collector box and/or a condensate trap. At least one of the condensate collector box and/or the condensate trap may include pH sensor (e.g., disposed within the respective component). The pH sensor is configured to measure a pH level of the condensate from the condensing heat exchanger. The furnace may include a control board configured to receive the pH level from the pH sensor. The control board may be configured to trigger a notification and/or change the operation of the furnace (e.g., to dilute the condensate) based on the received pH level. The notification may include at least one of: an illumination of an indicator disposed on the furnace, and a transmission of a signal to a communicating device such as a thermostat.

20 Claims, 7 Drawing Sheets

IDENTIFICATION OF PREMATURE HEAT EXCHANGER FAILURE

CROSS REFERENCE TO A RELATED APPLICATION

The application claims the benefit of U.S. Provisional Application No. 63/198,169 filed Oct. 1, 2020, the contents of which are hereby incorporated in their entirety.

BACKGROUND

The invention relates to the corrosion of condensing heat exchangers. More particularly, the invention relates to the use of a pH sensor to monitor the corrosive nature of condensate from the condensing heat exchangers.

Furnaces are commonly configured to generate heat by consuming an energy source (e.g., burning a combustible gas, such as natural gas or propane, or generating a resistance with electricity). When burning a combustible gas, the furnace generates an exhaust gas. This exhaust gas is predominantly made up of carbon dioxide, excess oxygen, nitrogen, and water vapor along with varying concentrations of acid-forming compounds which depend on environmental factors. When the exhaust gas gets cooled down below its dew point, the water vapor in the exhaust gas condenses on the heat exchanger walls and dissolves additional exhaust gas (e.g., containing sulfur, nitrogen, and chlorine-based anions). As the condensate reacts with these anions, the condensate dissolves the anions into acids, which make the condensate corrosive (e.g., especially to steel, which is what heat exchangers a commonly made of). Exposure to corrosive condensate can speed up the deterioration process of the heat exchanger. As such, it is important to monitor whether or not the condensate on the heat exchanger has excessive corrosive qualities so that remedial action can be taken to prevent, or at least mitigate, the premature failure of the heat exchanger.

Traditionally, furnaces are not designed to monitor the corrosive qualities of the condensate. As such homeowners and even service technicians are usually unaware that the heat exchanger is being exposed to corrosive condensate. Depending on the location of the furnace and the source of the incoming airflow (which may affect the amount contaminants in the incoming airflow), this problem with corrosive condensate can be especially troubling and fast-acting. For example, instead of failing over the course of a many years (when normal levels of contaminants are in the incoming airflow), the heat exchanger may fail in a matter of months (when high levels of contaminants are in the incoming airflow). These high levels of contaminants may be found in various different types of environments, such as, near pools (which may cause the incoming airflow to have high levels of chlorine) or hair salons (which may cause the incoming airflow to have high levels of sulfur). However, even if located in an environment associated with high levels of contaminants, if identified early enough, remedial action (e.g., such as cleaning the heat exchanger to remove the corrosive condensate and/or changing the location of where the incoming airflow is drawn from) can be taken to prevent, or at least mitigate, the premature failure of the heat exchanger.

Accordingly, there remains a need for a furnace that is capable of monitoring the corrosive nature of the condensate to prevent, or at least mitigate, the premature failure of the heat exchanger.

BRIEF DESCRIPTION

According to one embodiment, a furnace including a condensing heat exchanger, a condensate collector box, and a pH sensor is provided. The condensate collector box is in fluid communication with the condensing heat exchanger. The condensate collector box is configured to collect a condensate from the condensing heat exchanger. The pH sensor is disposed within the condensate collector box. The pH sensor is configured to measure a pH level of the condensate.

In accordance with additional or alternative embodiments, the furnace further includes a control board configured to receive the pH level of the condensate from the pH sensor and trigger a notification based on the received pH level.

In accordance with additional or alternative embodiments, the control board is configured to trigger the notification when at least one of: (i) the pH level of the condensate is greater than a threshold pH, and (ii) a differential pH limit is exceeded.

In accordance with additional or alternative embodiments, the threshold pH is 2.5.

In accordance with additional or alternative embodiments, the differential pH limit includes a change in pH level greater than 1.

In accordance with additional or alternative embodiments, the notification includes at least one of: an illumination of an indicator disposed on the furnace, and a transmission of a signal to a communicating device.

In accordance with additional or alternative embodiments, the control board is configured to change the operation of the furnace to dilute the condensate when at least one of: (i) the pH level of the condensate is greater than a threshold pH, and (ii) a differential pH limit is exceeded.

According to another aspect of the disclosure, a furnace including a condensing heat exchanger, a condensate collector box, a condensate trap, and a pH sensor is provided. The condensate collector box is in fluid communication with the condensing heat exchanger. The condensate collector box is configured to collect a condensate from the condensing heat exchanger. The condensate trap is in fluid communication with the condensate collector box. The condensate trap is configured to drain the condensate from the condensate collector box. The pH sensor is disposed within the condensate trap. The pH sensor is configured to measure a pH level of the condensate.

In accordance with additional or alternative embodiments, the furnace further includes a control board configured to receive the pH level of the condensate from the pH sensor and trigger a notification based on the received pH level.

In accordance with additional or alternative embodiments, the control board is configured to trigger the notification when at least one of: (i) the pH level of the condensate is greater than a threshold pH, and (ii) a differential pH limit is exceeded.

In accordance with additional or alternative embodiments, the threshold pH is 2.5.

In accordance with additional or alternative embodiments, the differential pH limit includes a change in pH level greater than 1.

In accordance with additional or alternative embodiments, the notification includes at least one of: an illumination of an indicator disposed on the furnace, and a transmission of a signal to a communicating device.

In accordance with additional or alternative embodiments, the control board is configured to change the operation of the furnace to dilute the condensate when at least one of: (i) the pH level of the condensate is greater than a threshold pH, and (ii) a differential pH limit is exceeded.

According to another aspect of the disclosure, a method of monitoring a furnace including a condensing heat exchanger and a pH sensor is provided. The method includes a step for measuring, with the pH sensor, a pH level of a condensate from the condensing heat exchanger, the pH level of the condensate being transmitted to a control board. The method includes a step for determining, in the control board, whether the pH level of the condensate indicates a need to trigger a notification.

In accordance with additional or alternative embodiments, the pH level indicates a need to trigger the notification when at least one of: (i) the pH level of the condensate is greater than a threshold pH, and (ii) a differential pH limit is exceeded.

In accordance with additional or alternative embodiments, the method further includes illuminating an indicator disposed on the furnace when the pH level of the condensate indicates the need to trigger the notification.

In accordance with additional or alternative embodiments, the method further includes transmitting a signal to a communicating device when the pH level of the condensate indicates the need to trigger the notification.

In accordance with additional or alternative embodiments, the communicating device is in communication with a network.

In accordance with additional or alternative embodiments, the method further includes changing the operation of the furnace to dilute the condensate when at least one of: (i) the pH level of the condensate is greater than a threshold pH, and (ii) a differential pH limit is exceeded.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

A furnace with a condensing heat exchanger and a pH sensor, and a method of monitoring such a furnace are provided. The furnace described herein, through incorporation and use of a pH sensor, may be better able (e.g., compared to traditional furnaces, which do not incorporate pH sensor) to monitor the corrosive nature of condensate (e.g., from the condensing heat exchanger), which may help prevent, or at least mitigate, the premature failure of the condensing heat exchanger. For example, by monitoring the pH of the condensate and triggering a notification based on the pH level, the furnace described herein may enable remedial action (e.g., such as cleaning the heat exchanger to remove the corrosive condensate and/or changing the location of where the incoming airflow is drawn from) to be taken (e.g., by the homeowner or service technician). Depending on the environment in which the furnace is configured, remedial action may be critical to ensure the long-term, efficient operation. For example, if configured near a pool or a hair salon, it may be critical to either clean the heat exchanger more often (e.g., whenever the condensate becomes corrosive), or change the location where the incoming air is being drawn from to ensure that the condensing heat exchanger, and the furnace of which the condensing heat exchanger is incorporated, has a long life (e.g., remaining operational and at designed efficiency for many years, instead of failing after a few months, which may be possible in environments with particularly high contaminants).

Figure 1:
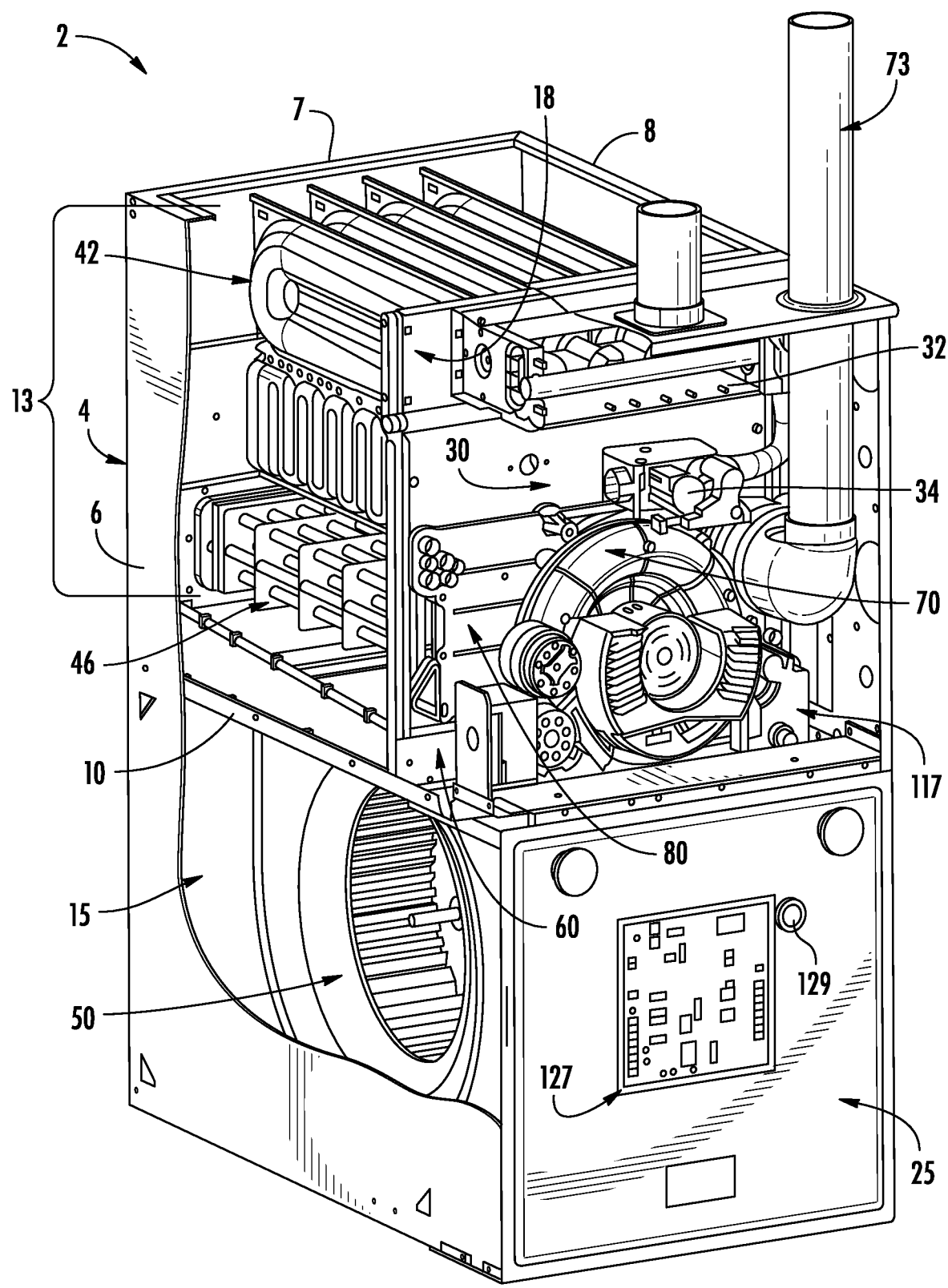
FIG. 1 is a perspective view of a furnace with a condensate collector box, in accordance with one aspect of the disclosure.
Figure 2:
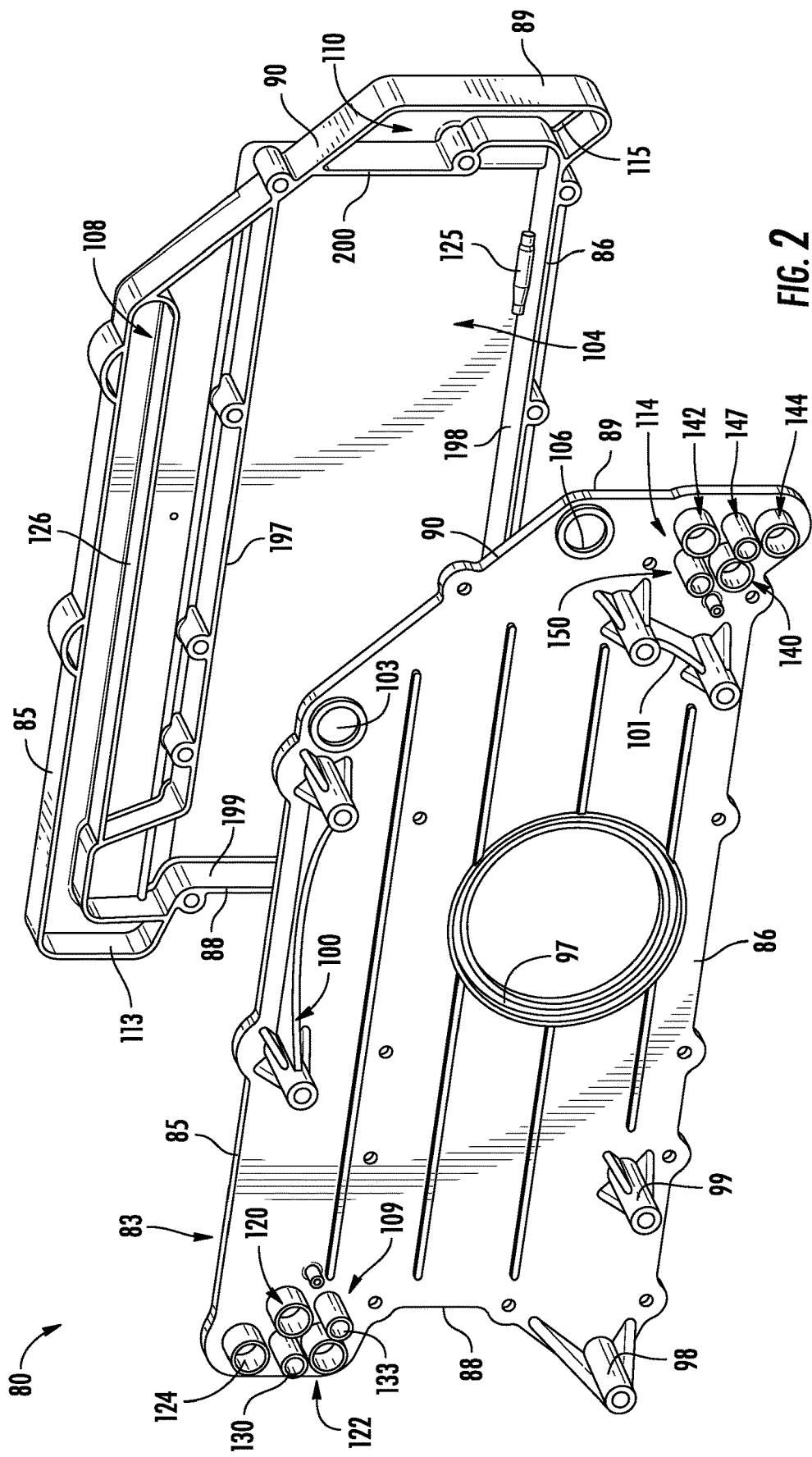
FIG. 2 is an exploded view of the condensate collector box shown in FIG. 1 with a pH sensor disposed within the condensate collector box, in accordance with one aspect of the disclosure.
Figure 4:
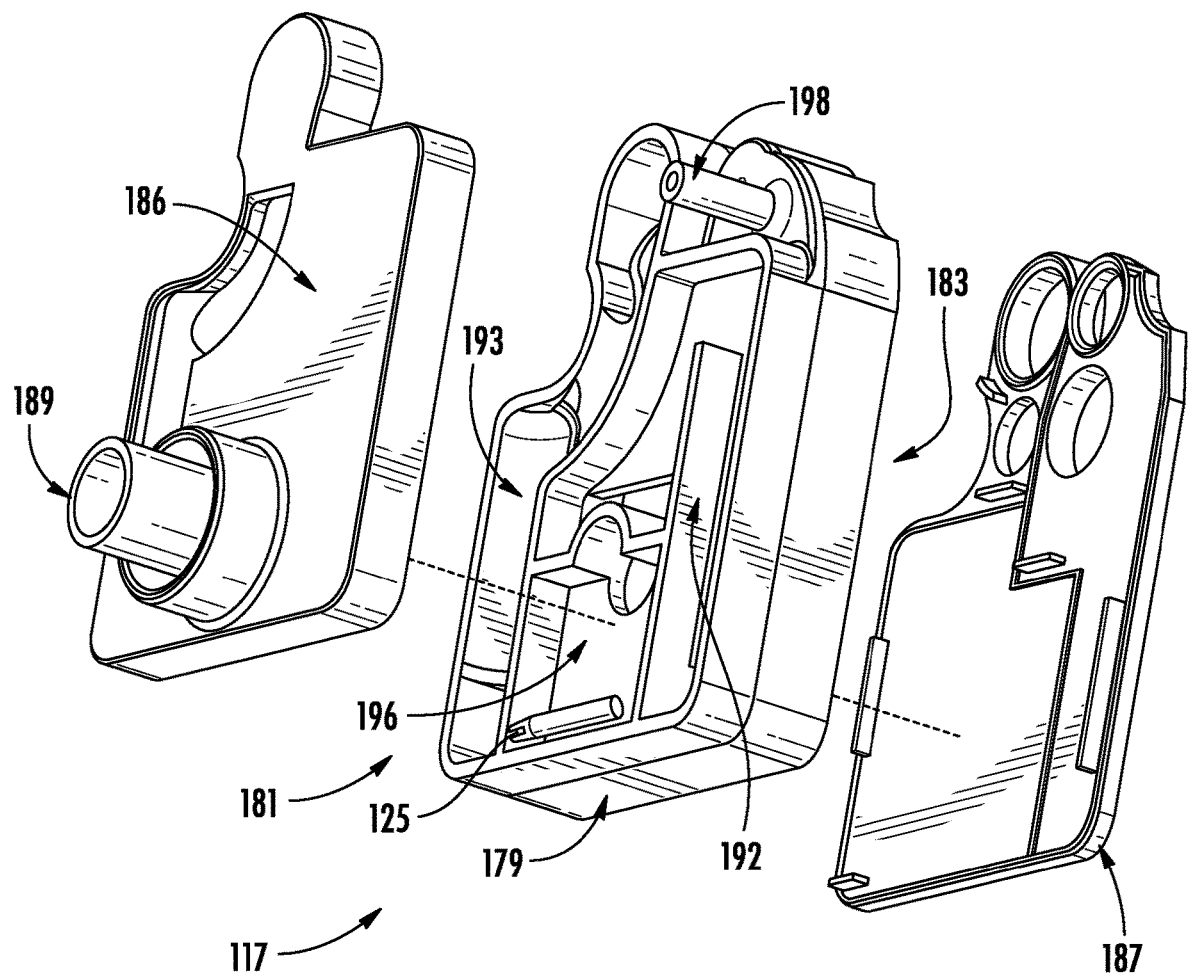
FIG. 4 is an exploded view of the condensate trap shown in FIG. 3 with a pH sensor disposed within the condensate trap, in accordance with one aspect of the disclosure.
Figure 5:
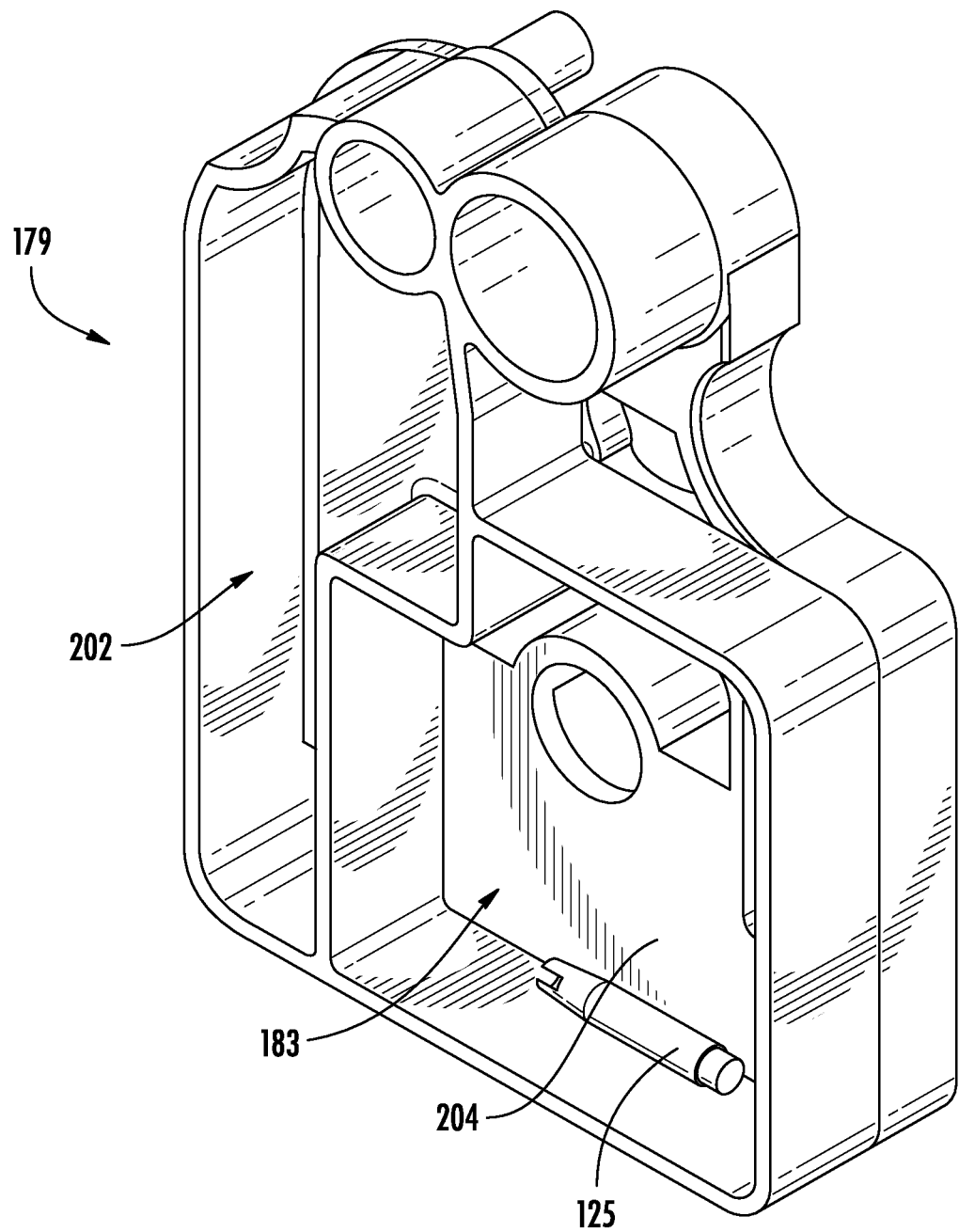
FIG. 5 is perspective view of the rear side of the condensate trap shown in FIG. 3 with a pH sensor disposed within the rear side, in accordance with one aspect of the disclosure.
Figure 6:
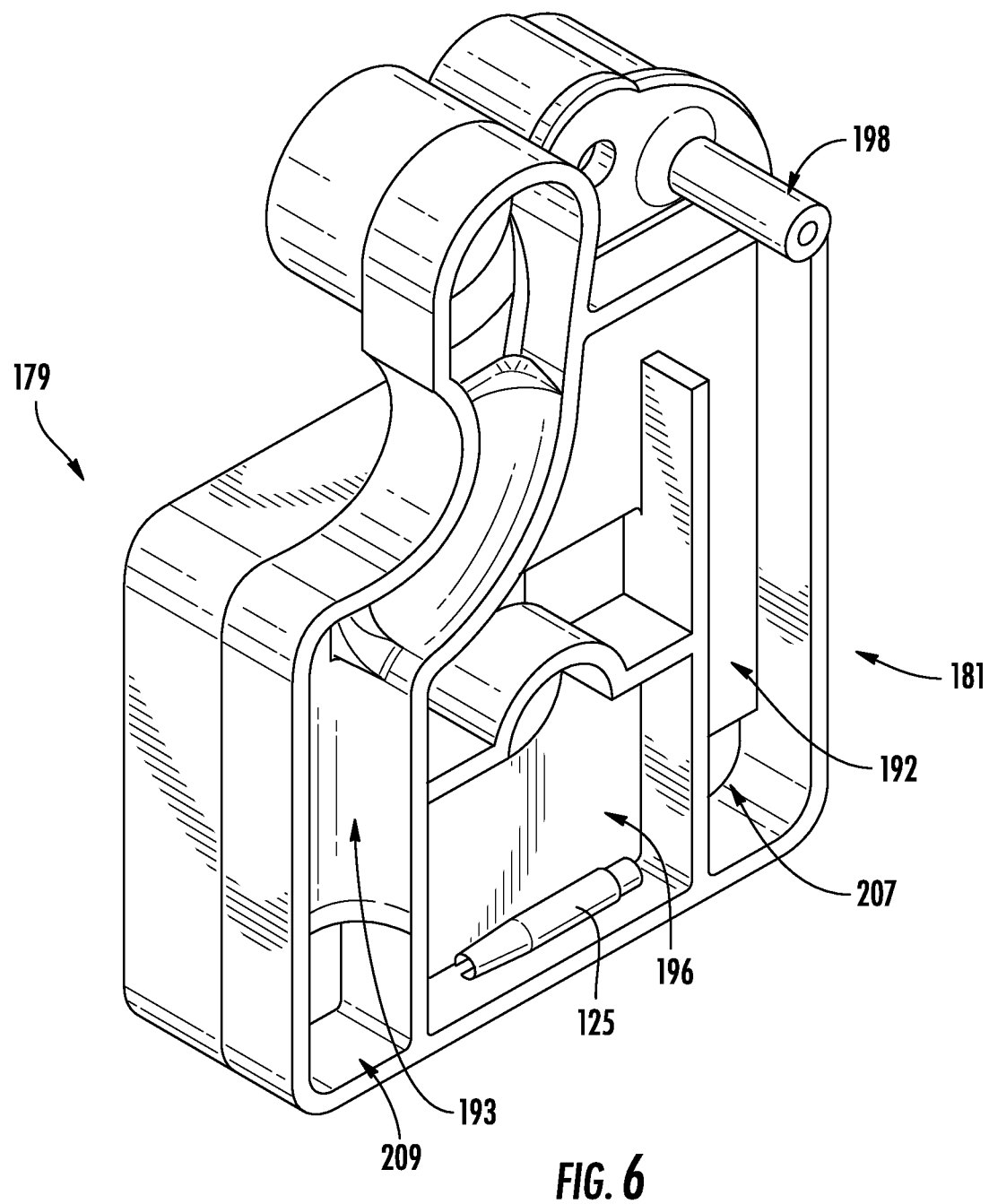
FIG. 6 is a perspective view of the front side of the condensate trap shown in FIG. 3 with a pH sensor disposed within the front side, in accordance with one aspect of the disclosure.

With reference now to the Figures, an exemplary furnace 2 is shown in FIG. 1. The furnace 2 includes a condensing heat exchanger 46 (shown in FIG. 1) and a pH sensor 125 (shown in FIGS. 2 and 4-6). The pH sensor 125 may be disposed within at least one of: the condensate collector box 80 (as shown in FIG. 2), and the condensate trap 117 (as shown in FIGS. 4-6). It should be appreciated that although only depicted with either the condensate collector box 80 or the condensate trap 117, the pH sensor 125 may be disposed within any location where the pH sensor 125 is able to measure a pH level of the condensate (e.g., from the condensing heat exchanger 46). For example, it is envisioned that the pH sensor 125 may be disposed within a separate vessel (e.g., a secondary condensate trap (not shown)) or a condensate drainpipe (not shown) either of which may be configured to receive at least a portion of the condensate from the condensing heat exchanger 46.

As shown in FIG. 1, the furnace 2 may include a housing 4, which may include a plurality of exterior walls 6-8 and an interior dividing wall 10 that forms a heat exchange portion 13 and a blower portion 15. The heat exchange portion 13 may include a component support wall 18, which may provide structural support for mounting various components of the furnace 2. The housing 4 may also include an access panel 25 that provides access (when removed/opened) to the blower portion 15 and another access panel (not shown) that provides access (when removed/opened) to the heat exchange portion 13. The access panel 25 may also provide access (when removed/opened) to the control board 127, which, as described in more detail below, may be configured to receive the pH level of the condensate from the pH sensor 125 and trigger a notification based on the received pH level.

The furnace 2, as shown in FIG. 1, may include a burner assembly 30 mounted to the component support wall 18. The burner assembly 30 may include a burner box 32 and a gas valve 34. The burner assembly 30 may be configured to combust a fuel (e.g., such as natural gas or propane) to generate heat. This heat may be used to heat an environment (e.g., a home, office building, etc.). The burner assembly 30 may produce an exhaust gas as a byproduct of combustion. The exhaust gas may be expelled to the ambient (e.g., outside of the environment). In the exemplary furnace 2 shown in FIG. 1, the burner assembly 30 is operatively connected to a primary heat exchanger 42 arranged within the heat exchanger portion 13. The primary heat exchanger 42 may be operatively coupled to a condensing heat exchanger 46, which may include a plurality of heat exchange members 46. As shown in FIG. 1, the furnace 2 may include a blower motor assembly 50, arranged within the blower portion 15, to draw air in the furnace 2 and direct the air over the primary heat exchanger 42 and the condensing heat exchanger 46 (e.g., to transfer heat to the air so as to heat the environment).

A portion of the exhaust gas (e.g., which may be predominantly made up of carbon dioxide, sulfur, and water vapor) that is produced during combustion, may condense in the condensing heat exchanger 46. This moisture may be collected and passed on to an external drain (not shown). The moisture may be guided to a condensate collector system 60 secured to the component support wall 18. As shown in FIG. 1, the furnace 2 may include an inducer fan assembly 70 mounted to the condensate collector system 60. The inducer fan assembly 70 may be used to create an airflow that establishes a draft which draws the products of combustion from the burner box 32 through the primary heat exchange portion 42 and the condensing heat exchanger 46, and into a flue vent 73. More specifically, the inducer fan assembly 70 may produce a pressure rise and a flow rate to achieve a combustion performance while overcoming flow losses within the furnace 2.

FIG. 2 depicts an exemplary condensate collector box 80 with a pH sensor 125 disposed within the condensate collector box 80. As shown, the condensate collector box 80 may include a main body 83 including a first and second opposing edge portions 85 and 86 that are joined together by third and fourth opposing edge portions 88 and 89. The edge portions 85, 86 and 88 and 89 define a first surface 92 and a second, opposing surface (not shown). The main body 83 includes an inducer fan opening 97, which may be used to provide passage for an inducer air flow created by the inducer fan assembly 70. The condensate collector box 80 may include a plurality of inducer fan mounting members 98-101. The condensate collector box 80 may also include a first inducer fan drain opening 103 and a second inducer fan drain opening 106. Each inducer fan drain opening 103 and 106 may align with an inducer fan drain passage (not shown) formed in the inducer fan assembly 70. The particular one of the inducer fan drain opening 103, 106 that aligns with the inducer fan drain passage may be dependent on the desired installation configuration. It is envisioned that the furnace 2 described herein may be capable of being mounted in a variety of different configurations, which may affect the alignment of the drain opening 103, 106. In a horizontal left configuration and downflow configuration, the inducer fan assembly 70 may function so as to fluidly align with the first inducer fan drain opening 103. In an upflow configuration and horizontal right configuration, the inducer fan assembly 70 may function so as to fluidly align with the second inducer fan drain opening 106.

The condensate collector box 80 may include an opening 104 (e.g., which may have a negative pressure) that leads to the heat exchange portion 13. The opening 104 may be defined between a plurality of side sections 197-200. The condensate from the heat exchanger portion 13 may enter the condensate collector box 80 through the opening 104. The pH sensor 125 may be disposed within the opening 104 (e.g., along any of the side sections 197-200) in certain instances. It should be appreciated that the location of the pH sensor 125 may be dependent on the configuration of the furnace 2 (e.g., it may be advantageous to place the pH sensor 125 in a location where condensate may first start to accumulate). The condensate collector box 80 may also include a first vent drain channel 108 (e.g., defined between the first edge 85 and the side wall 126) and a second vent drain channel 110 (e.g., defined between the fourth edge portion 89 and the side section 200), each of which may have a positive pressure. Both the first and second drain channels 108, 110 may include corresponding condensate collection zones 113, 115 respectively.

Figure 3:
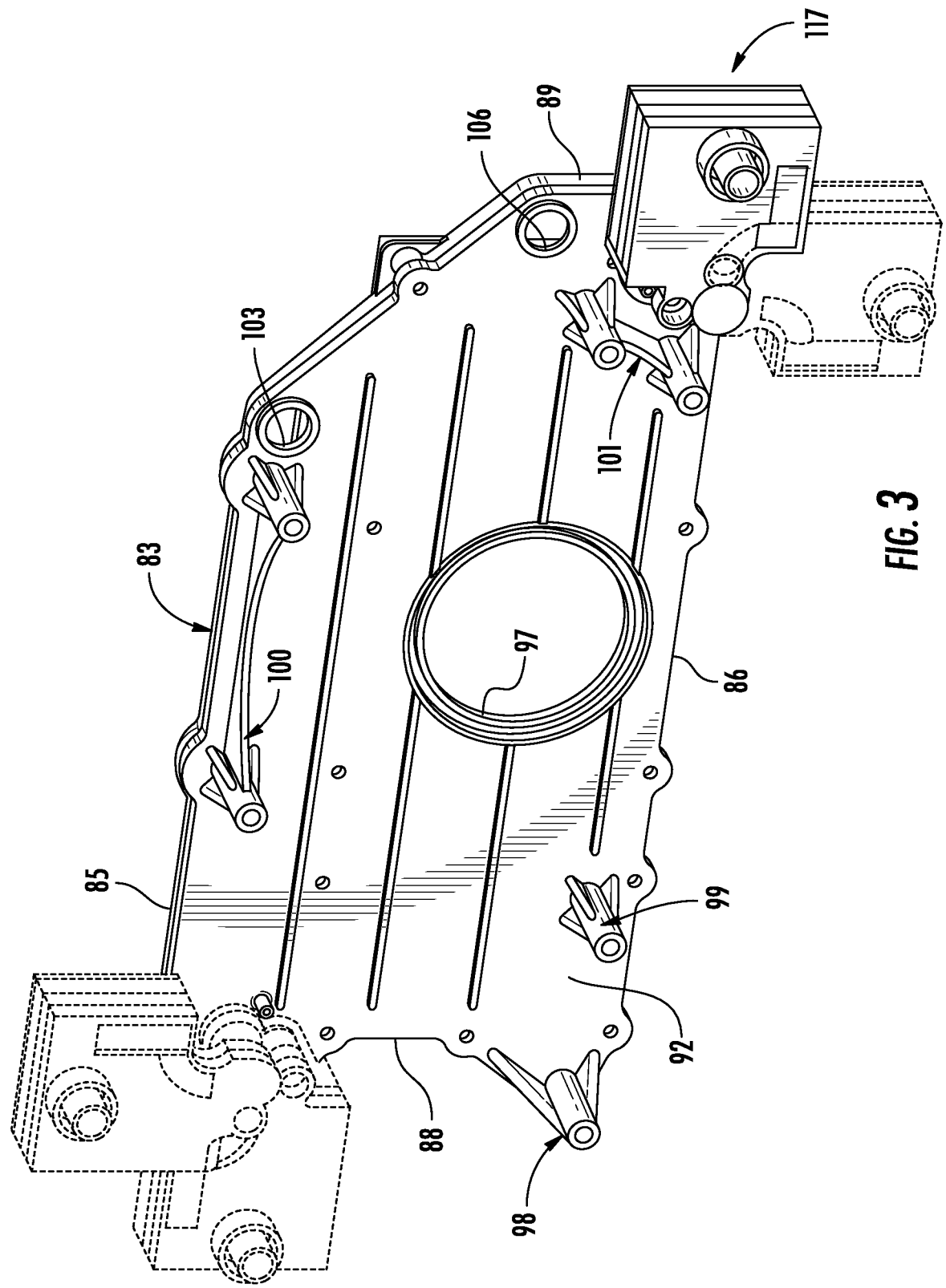
FIG. 3 is an assembled view of the condensate collector box shown in FIG. 2, illustrating multiple, alternative orientations of a condensate trap, in accordance with one aspect of the disclosure.

To further enhance installation flexibility, the condensate collector box 80 may include a first condensate trap mounting arrangement 109 and a second condensate trap mounting arrangement 114. Each condensate trap mounting arrangement 109, 114 may be used to support a condensate trap 117 in one of two orientations such as shown in FIG. 3, depending on the installation configuration of the furnace 2. As shown in FIG. 2, the first condensate trap mounting arrangement 109 may include a first condensate outlet port 120, a second condensate outlet port 122, and a third condensate outlet port 124. The first condensate outlet port 120 may direct condensate from the heat exchange portion 13 into the condensate trap 117. Second and third condensate outlet ports 122 and 124 may be used to pass condensate into the condensate trap 117 depending upon the orientation of the furnace 2. The first condensate mounting arrangement 109 is also shown in FIG. 2 to include a first condensate trap mounting member 130 and a second condensate trap mounting member 133. With this arrangement, the condensate trap 117 can be selectively mounting in one of two different orientations, such as shown in FIG. 3. For example, in a downflow configuration, condensate trap 117 may be mounted to the condensate trap mounting member 130 and positioned in fluid communication with condensate outlet ports 120 and 124. In a horizontal left configuration, the condensate trap 117 may be secured to the condensate trap mounting member 133 and positioned in fluid communication with condensate outlet ports 122 and 124. It should be appreciated that the phrase "in fluid communication" may be interpreted to mean connected in a manner that allows the passage of fluid (e.g., condensate).

Similarly, the second condensate trap mounting arrangement 114 may include a first condensate outlet port 140, a second condensate outlet port 142, and a third condensate outlet port 144. The first condensate outlet port 140 may direct condensate from heat exchange portion 13 into the condensate trap 117. The second and third condensate outlet ports 142 and 144 may pass condensate into the condensate trap 117 depending upon the orientation of the furnace 2. The second condensate trap mounting arrangement 114 is also shown in FIG. 2 to include a first condensate trap mounting member 147 and a second condensate trap mounting member 150. With this arrangement, the condensate trap 117 can be selectively mounted in one of two different orientations as shown in FIG. 3. For example, in an upflow configuration, the condensate trap 117 is mounted to the condensate trap mounting member 147 and positioned in fluid communication with condensate outlet ports 140 and 144. In a horizontal right configuration, condensate trap 117 is secured to condensate trap mounting member 150 and positioned in fluid communication with condensate outlet ports 120 and 142.

Reference now will be made to FIGS. 4-6, which illustrate an exemplary condensate trap 117 with a pH sensor 125 disposed within. As shown in FIG. 4, the condensate trap 117 may include a trap body 179 that has a first side 181 and a second side 183. The first side 181 may include a first cover member 186. Likewise, the second side 183 may include a second cover member 187. The first cover member 186 may include a drain outlet member 189 that delivers condensate from condensate trap 117 to an external drain (not shown). In accordance with the exemplary embodiment, the first side 181 of trap body 179 may include a first or positive pressure portion 192, a second or negative pressure portion 193, a drain chamber 196, and a pressure relief 198. The negative pressure portion 193 may include a curvilinear cross-section that reduces volume. As shown in FIG. 5, the second side of trap body 179 may include a positive pressure chamber 202 and a drain chamber 204. The positive pressure portion 192 and positive pressure chamber 202 may be in fluid communication with the drain chamber 196 (shown in FIG. 4). As shown in FIG. 6, the negative pressure portion 193 may be in fluid communication with the drain chamber 204 and receive condensate from the heat exchange portion 13. The condensate trap 117 may include a first passage 207 that fluidly connects the positive pressure portion 192 and the positive pressure chamber 202, and a second passage 209 that fluidly connects negative pressure portion 193 and drain chamber 204. With this arrangement, the condensate may be collected in drain chambers 196 and 204. It should be appreciated that the pH sensor 125 may be disposed within either of the drain chambers 196, 204 in certain instances so as to be able to measure the pH level of the condensate.

As mentioned above, the pH sensor 125 may transmit the measured pH level of the condensate to the control board 127. It should be appreciated that the measured pH level may be transmitted to the control board 127 using a short-range communication such as Bluetooth, Bluetooth Low Energy (BTLE), Zigbee, infrared, ultra-wide band (UWB), and Wi-Fi or a wired communication such as UART, Serial, Fiber-optic, SPI, Ethernet cable, or an analog sensor configured to transmit a voltage or current signal. The control board 127 may be configured to receive the pH level of the condensate and trigger a notification based on the received pH level (e.g., if the pH level indicates the condensate is corrosive). The control board 127 may include a processor to enable the determination of whether or not a notification should be triggered. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously.

The determination of whether or not the notification should be triggered may be dependent on either (i) whether the pH level has exceeded a threshold pH level, or (ii) whether the pH level indicates a differential pH has been exceeded. For example, the control board 127 may be configured to trigger a notification when the pH level of the condensate is greater than a threshold pH such as 2.5 in certain instances. It should be appreciated that the threshold pH may vary based on, among other factors, the type of material being exposed to the condensate. In other instances, the control board 127 may be configured to trigger a notification when a differential pH is exceeded. The differential pH may be a change in pH level greater than 1. For example, the pH sensor 125 may take an initial pH level measurement shortly after installation and use that measurement as a baseline comparison for later pH level measurements. If the difference between the initial pH level measurement and a later pH level measurement is greater than 1 then the control board 127 may trigger a notification. It should be appreciated that the pH level (e.g., used to make the determination of whether or not a notification should be triggered) may be an averaged value (e.g., calculated in the control board 127 using aggregated pH values over a given period of time, which may exclude pH level readings taken during certain operational cycles of the furnace 2). For example, the control board 127 may calculate an averaged pH level based on readings taken toward the end of the operational cycle of the furnace 2, which may exclude pH level readings taken during the startup of the furnace 2.

The notification may include at least one of: (i) an illumination of an indicator 129 (e.g., disposed on the furnace 2), and (ii) the transmission of a signal to a communicating device such as a thermostat. For example, the control board 127 may (e.g., through a wired or wireless connection) cause an indicator 129 to illuminate or blink so as to signal (e.g., to a homeowner and/or service technician viewing the indicator 129) that remedial action (e.g., such as cleaning the corrosive condensate and/or changing the location of where the incoming airflow is drawn from) needs to be taken. It is envisioned that when transmitting a signal to a communicating device (not shown) remote monitoring may be possible. For example, the communicating device may be connected (e.g., through a local router, etc.) to an online service and/or monitoring platform (e.g., housed in a remote, cloud-based network), which may enable the corrosive nature of the condensate to be monitored remotely. It is envisioned that, through this online service and/or monitoring platform, the owner(s) of the furnace 2 and/or local service technician(s) may be contacted and/or notified when remedial action is be needed to prevent the condensate from damaging the condensing heat exchanger 46.

Figure 7:
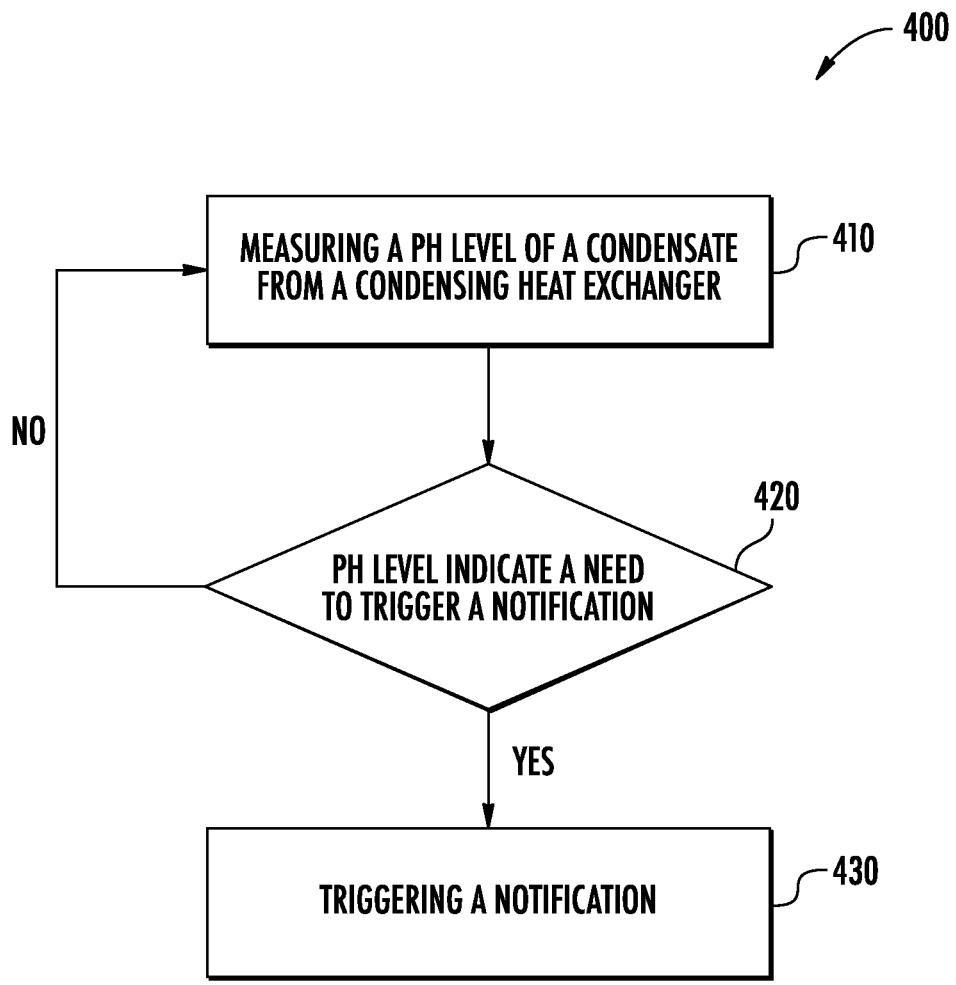
FIG. 7 is a flow diagram illustrating a method of monitoring a furnace in accordance with one aspect of the disclosure.

The furnace 2, as described above, may enable more robust monitoring (e.g., when compared to traditional furnaces, which do not include pH sensors), which may help prevent, or at least mitigate, the premature failure of the condensing heat exchanger 46. An exemplary method 400 of monitoring a furnace 2 is illustrated in FIG. 7. The method 400 may be performed, for example, using the exemplary furnace 2 shown in FIG. 1, which may include a pH sensor 125 disposed within at least one of: a condensate collector box 80 (as shown in FIG. 2) and a condensate trap 117 (as shown in FIGS. 4-6). The method 400 includes step 410 for measuring, with the pH sensor 125, a pH level of a condensate from the condensing heat exchanger 46, the pH level of the condensate being transmitted to a control board 127. The method 400 includes step 420 for determining, in the control board 127 (e.g., in the processor of the control board 127), whether the pH level of the condensate indicates a need to trigger a notification. As described above, the determination of whether or not the notification should be triggered may be dependent on either (i) whether the pH level has exceeded a threshold pH level, or (ii) whether the pH level indicates a differential pH has been exceeded. As shown in FIG. 7, the method 400 provides step 430 for triggering a notification when the pH level of the condensate indicates a need to trigger a notification. As described above, the notification may include at least one of: (i) an illumination of an indicator 129 (e.g., disposed on the furnace 2), and (ii) the transmission of a signal to a communicating device such as a thermostat. It is envisioned that this notification may alert a homeowner and/or a service technician (e.g., through online service and/or monitoring platform) that remedial action (e.g., such as cleaning the corrosive condensate and/or changing the location of where the incoming airflow is drawn from) needs to be taken. It should be appreciated that the remedial action described above may be either manual or automated. For example, instead of relying on an external party (e.g., such as a homeowner or service technician) to manually clean the corrosive condensate, the furnace 2 may be configured to adjust operation to automatically remedy the situation. This remedy may be in the form of diluting the condensate. For example, the control board 127 (e.g., based on the pH level) may change the operation of the furnace 2 to increase the quantity of the condensate being produced so as to dilute the acid in the condensate, thus reducing the corrosive effects of the condensate. This adjustment may include changing at least one of: (i) the gas input rate, (ii) the combustion air, and (iii) the blower speed/airflow. It is envisioned that the furnace 2 may utilize other feedback mechanisms (e.g., which may be known to those of ordinary skill in the art) to ensure that the remedial action does not overly, negatively affect the customer or the furnace 2. Regardless of whether the remedial action is manual or automated, the remedial action may help prevent, or at least mitigate, the premature failure of the condensing heat exchanger 46.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A furnace comprising:
    a condensing heat exchanger;
    a condensate collector box in fluid communication with the condensing heat exchanger, the condensate collector box configured to collect a condensate from the condensing heat exchanger;
    a pH sensor disposed within the condensate collector box, the pH sensor configured to measure a pH level of the condensate; and
    a control board configured to receive the pH level of the condensate from the pH sensor, wherein the control board is configured to change the operation of the furnace to dilute the condensate based on the received pH level of the condensate.

2. The furnace of claim 1, wherein the control board is configured to trigger a notification based on the received pH level.

3. The furnace of claim 2, wherein the control board is configured to trigger the notification when at least one of: (i) the pH level of the condensate is greater than a threshold pH, and (ii) a differential pH limit is exceeded.

4. The furnace of claim 3, wherein the threshold pH is 2.5.

5. The furnace of claim 3, wherein the differential pH limit comprises a change in pH level greater than 1.

6. The furnace of claim 2, wherein the notification comprises at least one of: an illumination of an indicator disposed on the furnace, and a transmission of a signal to a communicating device.

7. The furnace of claim 1, wherein the control board is configured to change the operation of the furnace to dilute the condensate when at least one of: (i) the pH level of the condensate is greater than a threshold pH, and (ii) a differential pH limit is exceeded.

8. A furnace comprising:
    a condensing heat exchanger;
    a condensate collector box in fluid communication with the condensing heat exchanger, the condensate collector box configured to collect a condensate from the condensing heat exchanger;
    a condensate trap in fluid communication with the condensate collector box, the condensate trap configured to drain the condensate from the condensate collector box;
    a pH sensor disposed within the condensate trap, the pH sensor configured to measure a pH level of the condensate; and
    a control board configured to receive the pH level of the condensate from the pH sensor, wherein the control board is configured to change the operation of the furnace to dilute the condensate based on the received pH level of the condensate.

9. The furnace of claim 8, wherein the control board is configured to trigger a notification based on the received pH level.

10. The furnace of claim 9, wherein the control board is configured to trigger the notification when at least one of: (i) the pH level of the condensate is greater than a threshold pH, and (ii) a differential pH limit is exceeded.

11. The furnace of claim 10, wherein the threshold pH is 2.5.

12. The furnace of claim 10, wherein the differential pH limit comprises a change in pH level greater than 1.

13. The furnace of claim 9, wherein the notification comprises at least one of: an illumination of an indicator disposed on the furnace, and a transmission of a signal to a communicating device.

14. The furnace of claim 9, wherein the control board is configured to change the operation of the furnace to dilute the condensate when at least one of: (i) the pH level of the condensate is greater than a threshold pH, and (ii) a differential pH limit is exceeded.

15. A method of monitoring a furnace comprising a condensing heat exchanger and a pH sensor, the method comprising:
    measuring, with the pH sensor, a pH level of a condensate from the condensing heat exchanger, the pH level of the condensate being transmitted to a control board; and
    changing, with the control board, the operation of the furnace to dilute the condensate based on the measured pH level of the condensate.

16. The method of claim 15, further comprising:
    determining, in the control board, whether the pH level of the condensate indicates a need to trigger a notification, wherein the pH level indicates a need to trigger the notification when at least one of: (i) the pH level of the condensate is greater than a threshold pH, and (ii) a differential pH limit is exceeded.

17. The method of claim 15, further comprising illuminating an indicator disposed on the furnace when the pH level of the condensate indicates a need to trigger a notification.

18. The method of claim 15, further comprising transmitting a signal to a communicating device when the pH level of the condensate indicates a need to trigger a notification.

19. The method of claim 18, wherein the communicating device is in communication with a network.

20. The method of claim 15, further comprising changing the operation of the furnace to dilute the condensate when at least one of: (i) the pH level of the condensate is greater than a threshold pH, and (ii) a differential pH limit is exceeded.

* * * * *